United States Patent [19]
Kijima et al.

[11] Patent Number: 6,158,682
[45] Date of Patent: *Dec. 12, 2000

[54] TAPE RUNNING APPARATUS

[75] Inventors: Masayuki Kijima; Hideo Nishijima; Kaneyuki Okamoto, all of Hitachinaka; Takeo Ohkouchi, Ibaragi-ken; Yukinobu Tada, Ebina, all of Japan

[73] Assignee: Hitachi, Ltd., Tokyo, Japan

[*] Notice: This patent is subject to a terminal disclaimer.

[21] Appl. No.: 09/512,326

[22] Filed: Feb. 24, 2000

Related U.S. Application Data

[63] Continuation of application No. 09/187,708, Nov. 6, 1998, Pat. No. 6,089,485, which is a continuation of application No. 08/708,097, Aug. 27, 1996, Pat. No. 5,839,683.

[30] Foreign Application Priority Data

Sep. 8, 1995 [JP] Japan .............................. Po7-231020

[51] Int. Cl.⁷ .............................. B65H 59/38; G11B 15/46
[52] U.S. Cl. ..................................... 242/334.2; 242/334.3; 360/73.01
[58] Field of Search .............................. 242/334.2, 334.3, 242/334.5; 360/73.01, 73.06

[56] References Cited

U.S. PATENT DOCUMENTS 4,516,740  5/1985  Yoshino et al. .................. 242/334.5 X
5,839,683  11/1998 Kijima et al. ......................... 242/334.2

FOREIGN PATENT DOCUMENTS 4-102251  4/1992  Japan .

Primary Examiner—John Q. Nguyen
Attorney, Agent, or Firm—Mattingly, Stanger & Malur, P.C.

[57] ABSTRACT

On the occasion of stopping the tape running at a high speed, a winding radius of the tape supply reel is detected to set the tape deceleration rate (a) on the basis of the detected winding radius of the supply reel. After the tape running speed is decelerated up to the allowable speed VL in the predetermined deceleration rate (a), the tape is stopped by effectuating the brake. Thereby, the tape can be driven at the speed higher than the allowable speed VL without generating any damage, enabling reduction of time required for the fast-forward/rewind operation. Moreover, application flexibility is improved by providing a couple of tape running modes at the first high speed V1 which is higher than the allowable speed VL and the second high speed V2 which is lower than the allowable speed VL. In addition, running of the tape can be ceased within the predetermined time t from the input of the stop command signal by specifying the maximum speed Vmax depending on the preset deceleration rate (a) and limiting the tape running speed with the maximum speed Vmax.

2 Claims, 5 Drawing Sheets

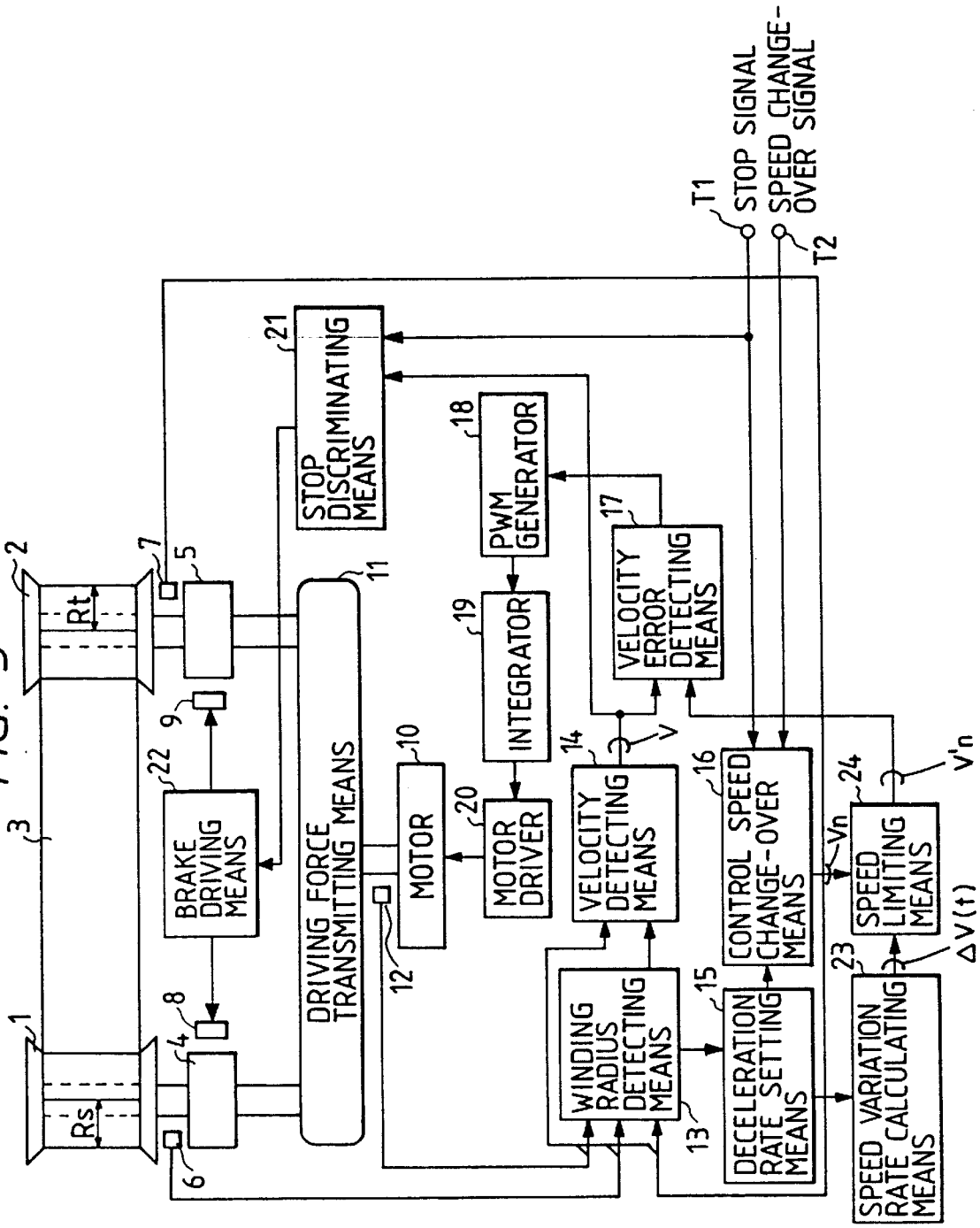

TAPE RUNNING APPARATUS

This is a continuation application of U.S. Ser. No. 09/187,708, filed Nov. 6, 1998, U.S. Pat. No. 6,089,485, which is a continuation application of U.S. Ser. No. 08/708,097, filed Aug. 27, 1996, U.S. Pat. No. 5,839,683.

BACKGROUND OF THE INVENTION

The present invention relates to a tape running apparatus through the drive of reels to wind up the tape to a take-up reel from a tape supply reel and particularly to a tape running apparatus which has reduced the fast-forward/rewind time without giving any damage on the tape running mechanism and the tape itself.

It has been proposed to implement speed control by setting the allowable speed determined by the tape running apparatus as the target speed. According to this method, since the tape is running at the allowable speed which does not give any damage thereon even if the current tape running speed is braked, the tape is not damaged if the running is braked immediately, responding to input of the stop command signal. That is, the tape can be run at a high speed without generation of damage.

However, the tape running method explained above has a problem that characteristics of motor cannot be utilized in the full-scale because the speed control is implemented at the allowable speed not giving any damage on the tape.

SUMMARY OF THE INVENTION

It is an object of the present invention to realize running of the tape at the speed higher than the allowable speed without giving any damage on the tape in order to reduce the time required for fast-forward/rewind.

In view of attaining the object explained above, the tape running apparatus of the present invention comprises a tape speed control means for running the tape at the speed Vn which is remarkably higher than the ordinary playback (reproduction) speed, a velocity detecting means for detecting the tape running speed V, a tape winding radius detecting means for detecting a winding radius value of the tape supply reel, a deceleration rate setting means for setting the deceleration rate (a) depending on the winding radius value of the supply reel detected by the winding radius detecting means, a velocity decelerating means for decelerating the tape speed in the deceleration rate (a) set depending on the input of a stop command signal, and a running stop means for stopping the running of the tape when the tape speed V detected by the speed detecting means becomes lower than the allowable speed VL after the stop command signal is inputted.

Moreover, the speed control means further comprises a first speed control means for running the tape at the first high speed V1 higher than the allowable speed VL, a second speed control means for running the tape at the second high speed V2 lower than the allowable speed VL and a speed changeover means for changing over the first and second speed control means depending on the input of a speed changeover command signal and is constituted to generate a speed changeover signal for changing over the first and second high speed running means for each input of the high speed running command input while the tape is running at the first high speed V1 or the second high speed V2.

In addition, a speed limiting means is also comprised to calculate a speed variation rate Δ V(t) when the tape speed is decelerated by the deceleration rate setting means in the deceleration rate (a) for the predetermined time t in order to limit the speed Vn by setting an added value of the speed variation rate Δ V(t) and the allowable speed VL or an added value of the speed variation rate Δ V(t) and the second high speed V2 as the maximum running speed Vmax.

With the constitution explained above, a winding diameter of the supply reel is detected and the deceleration rate (a) is set depending on the reel winding diameter detected. Therefore, the supply reel never supplies the tape, during the deceleration of the speed, in such amount as cannot be wound by the take-up reel. After the tape running speed is decelerated to the allowable speed or lower not giving any damage on the tape when it is braked, the tape running is stopped by the braking or the like. Thereby, the tape is never damaged even when the tape running at a higher speed is stopped. Therefore, problems regarding the tape running at the speed higher than the allowable speed can be solved to realize further reduction of the time required for fast forward/rewind operation.

Moreover, the constitution to change over the first and second high speeds V1 and V2 for the control enables improvement in the application flexibility for tape positioning.

In addition, transition of the tape speed to the speed lower than the allowable speed can be completed within the predetermined time t from the input of the stop command signal or speed change-over command signal and thereby the time required for stop and transition time to each running mode can be set by calculating speed variation rate at the time of decelerating the speed in the deceleration rate (a) for only the predetermined time t and then limiting the speed with the maximum speed preset depending on such amount of speed change.

BRIEF DESCRIPTION OF THE DRAWINGS

FIG. 5 is a block diagram of the other embodiment of a tape running apparatus of the present invention.

DESCRIPTION OF THE PREFERRED EMBODIMENTS

Figure 1:
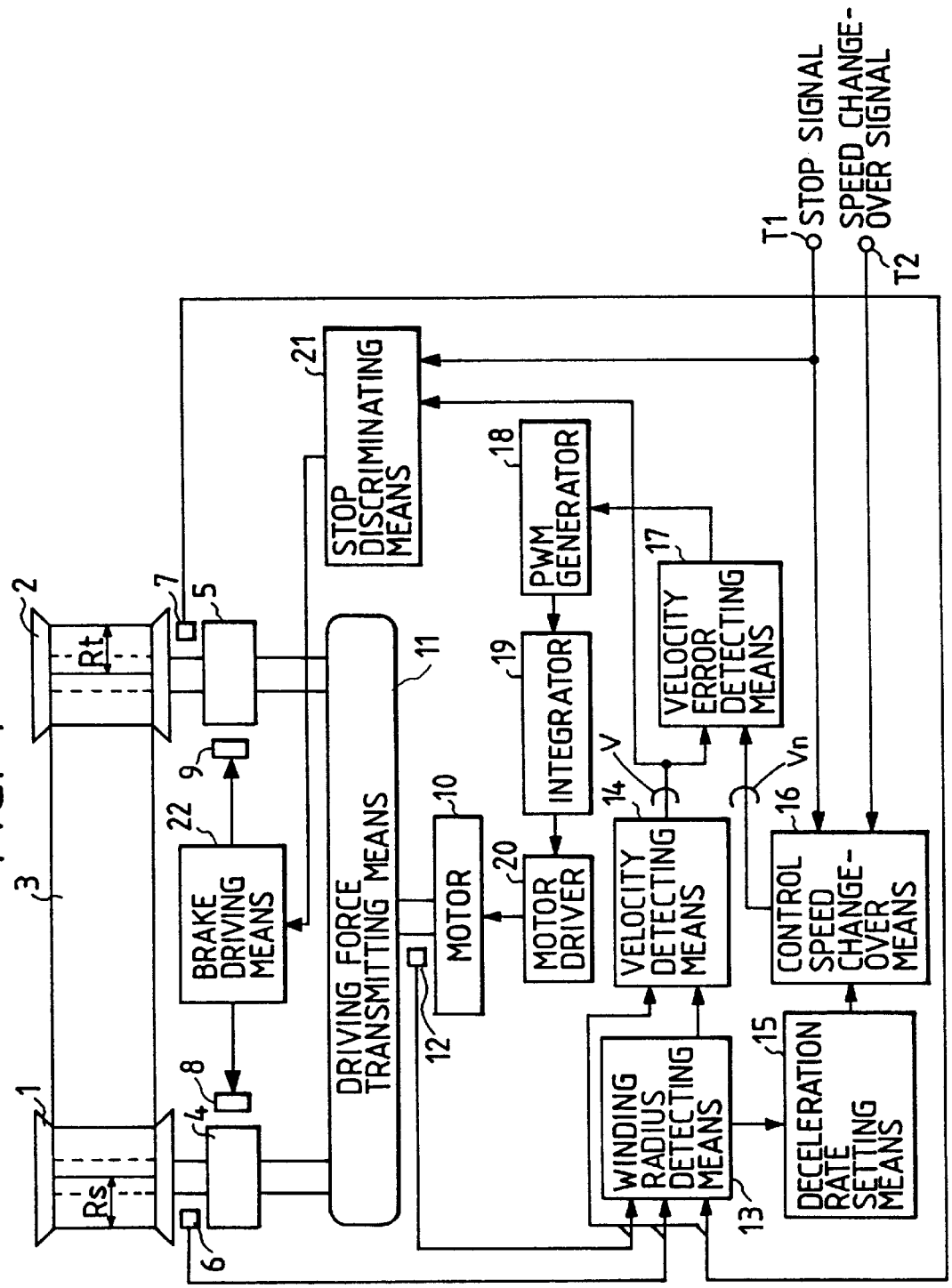
FIG. 1 is a block diagram illustrating an embodiment of a tape running apparatus of the present invention.

A preferred embodiment of the present invention will be explained with reference to the block diagram of FIG. 1. In FIG. 1, the reference numerals 1, 2 designate reels; 3, a tape; 4, 5, reel bases; 6, a measuring instrument for measuring the rotating period Ts of the reel base 4 from FG (Frequency Generator) pulse obtained in proportion to rotation of the reel base 4; 7, a measuring instrument for measuring the rotating period Tt of the reel base 5 from FG pulse obtained in proportion to rotation of the reel base 5; 8, 9, brakes; 10, a motor; 11, a driving force transmitting means for transmitting a rotating drove force of the motor 10 to the reel base 4 or reel base 5; 12, a measuring instrument for measuring the rotating period Tc of the motor 10 from the FG pulse obtained in proportion to rotation of the motor 10; 13, a winding radius detecting means; 14, a velocity detecting means; 15, a deceleration rate setting means; 16, a control speed change-over means; 17, a velocity error detecting means; 18, a PWM (Pulse Width Modulation signal) generator; 19, an integrator; 20, a motor driver; 21, a stop discriminating means; 22, a brake driving means; and T1, T2, input terminals.

First, operations when the tape is running at the speed Vn will be explained.

The motor 10 rotates to generate a driving force by receiving an output signal from a motor driver 20. A driving force of the motor 10 is then transmitted, via the driving force transmitting means 11, to the reel base 5 during the normal rotation or to the reel base 4 during the inverse rotation. Therefore, the tape 3 is wound by the reel 2 during the normal rotation or by the reel 1 during the inverse rotation. In this case, the rotating period of the reel base 4 is measured with the measuring instrument 6, that of the reel base 5 with the measuring instrument 7 and that of the motor 10 with the measuring instrument 12, respectively. The measured rotating period data of the reel bases 4,5 and motor 10 are inputted to the winding radius detecting means 13 and velocity detecting means 14.

The winding radius detecting means 13 detects the winding radius values Rs, Rt of the reels 1, 2, for example, from the following equation (1).

$$Rs = \sqrt{S/(\pi \cdot (1+(Tt/Ts)^2))}, \quad Rt = \sqrt{S/\pi \cdot (1(Ts/Tt)^2)} \quad (1)$$

However, S indicates a total winding area of the tape including the reel hub when it is observed from the upper side. Moreover, the velocity detecting means 14 detects the running speed V of the tape, for example, from the following equation (2).

$$V = 2 \cdot \pi \cdot Rt/Tt \quad (2)$$

The winding radius data Rs, Rt detected by the winding radius detecting means 13 are inputted to the velocity detecting means 14 and deceleration rate setting means 15. Moreover, the speed data V detected by the velocity detecting means 14 is then inputted to the velocity error detecting means 17 and stop discriminating means 21.

Figure 2:
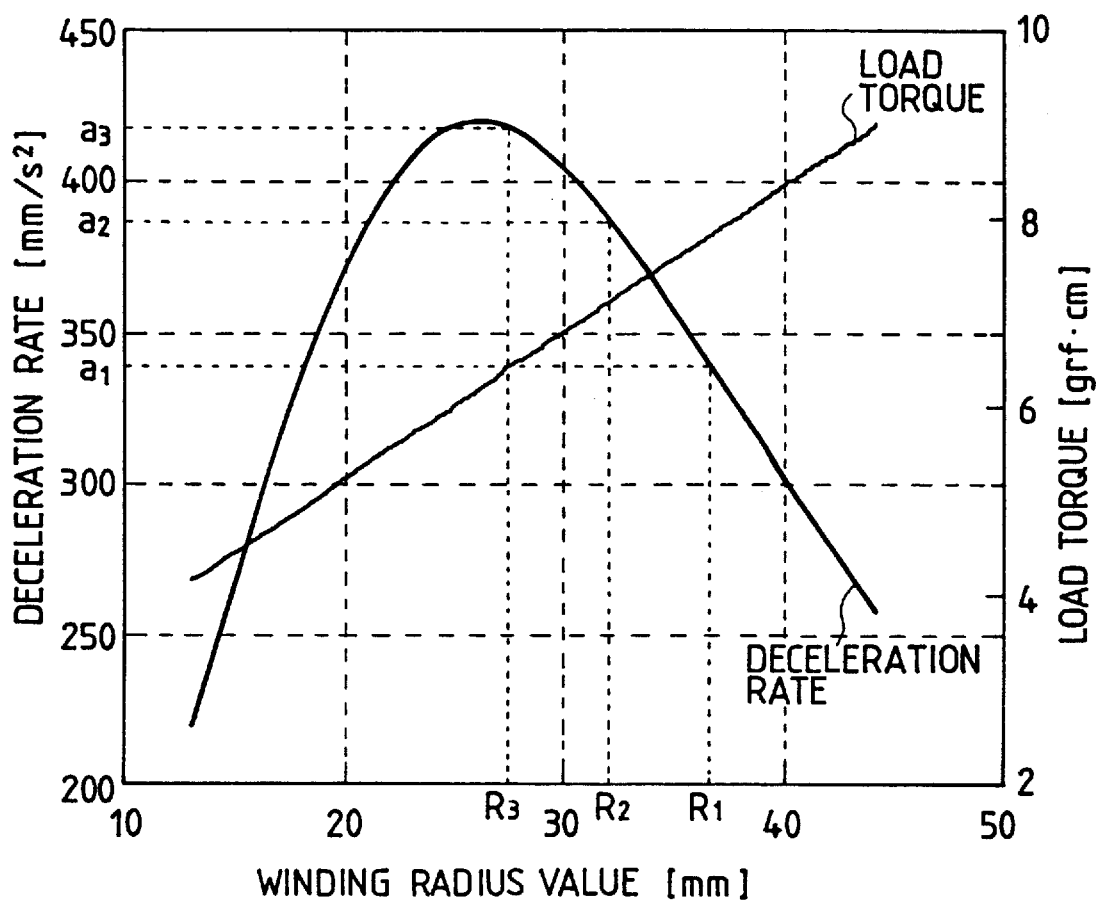
FIG. 2 is a graph showing relationship between winding radius value and deceleration rate in the present invention.

In the deceleration rate setting means 15, the deceleration rate (a) which does not generate looseness of tape at the time of deceleration of speed is set by the winding radius data Rs or Rt inputted from the winding radius detecting means 13. Here, for the running at the deceleration rate not generating looseness of the tape, the deceleration rate (a) of the tape take-up reel to be controlled must be set to the speed lower than the speed decelerated by the load torque of the tape supply reel freed from control. Namely, the deceleration rate (a)[mm/s$^2$] is set by the following equation (3). In the equation (3), T, R, I indicate respectively a load torque [grf/cm], winding radius value [mm] and inertia moment [gr/mm$^2$] of the tape supply reel. Here, the load torque T, inertia moment I must be obtained previously by the measurement or the like. In addition, the tape supply side is located in the side of reel 1 during the normal rotation or in the side of reel 2 during the inverse rotation. A relationship between the winding radius value set by the equation (3) and the deceleration rate (a) is shown in FIG. 2. Where, both sides of equal mark are set equal in the equation (3).

$$a \leq T \cdot R/I \quad (3)$$

The deceleration rate (a) set by the deceleration rate setting means 15 is inputted by the control speed change-over means 16. In the control speed change-over means 16, the control speed Vn is set by the speed change-over signal inputted via the terminal T2. The preset control speed Vn is inputted to the velocity error detecting mans 17. In this velocity error detecting means 17, an error element between the speed data V detected by the velocity detecting means 14 and the control speed Vn set by the control speed change-over means 16 is calculated. The tape running speed V is caused to follow up the control speed Vn by feeding back the velocity error element calculated by the velocity error detecting means 17 to the motor 10 via the PWM generator 18, integrator 19 and motor driver 20.

Next, the operation for stopping the tape from the running speed Vn will then be explained with reference to the waveform diagrams of FIG. 3 and FIG. 4.

For stopping the running of tape, a stop signal is first inputted to the control speed change-over means 16 and stop discriminating means 21 via the terminal T1. In the control speed change-over means 16, subtraction of the control speed Vn is started with input of the stop signal. Here, amount of subtraction of the control speed Vn per unit time is proportional to the deceleration rate (a) inputted by the deceleration rate setting means. Therefore, the control speed Vn changes with an inclination corresponding to the deceleration rate (a). Accordingly, the running speed V follows up the control speed Vn and is reduced in the deceleration rate (a). On the other hand, after the stop signal is inputted, the stop discriminating means 21 outputs the brake permitting signal, upon detection that the speed data V inputted from the velocity detecting means 14 becomes lower than the allowable speed VL. The brake permitting signal outputted from the stop discriminating means 21 is then inputted to the brake driving means 22. This brake driving means 22 drives the brakes 8, 9 with the brake permitting signal from the stop discriminating means 21 to stop the running of the tape.

Figure 3:
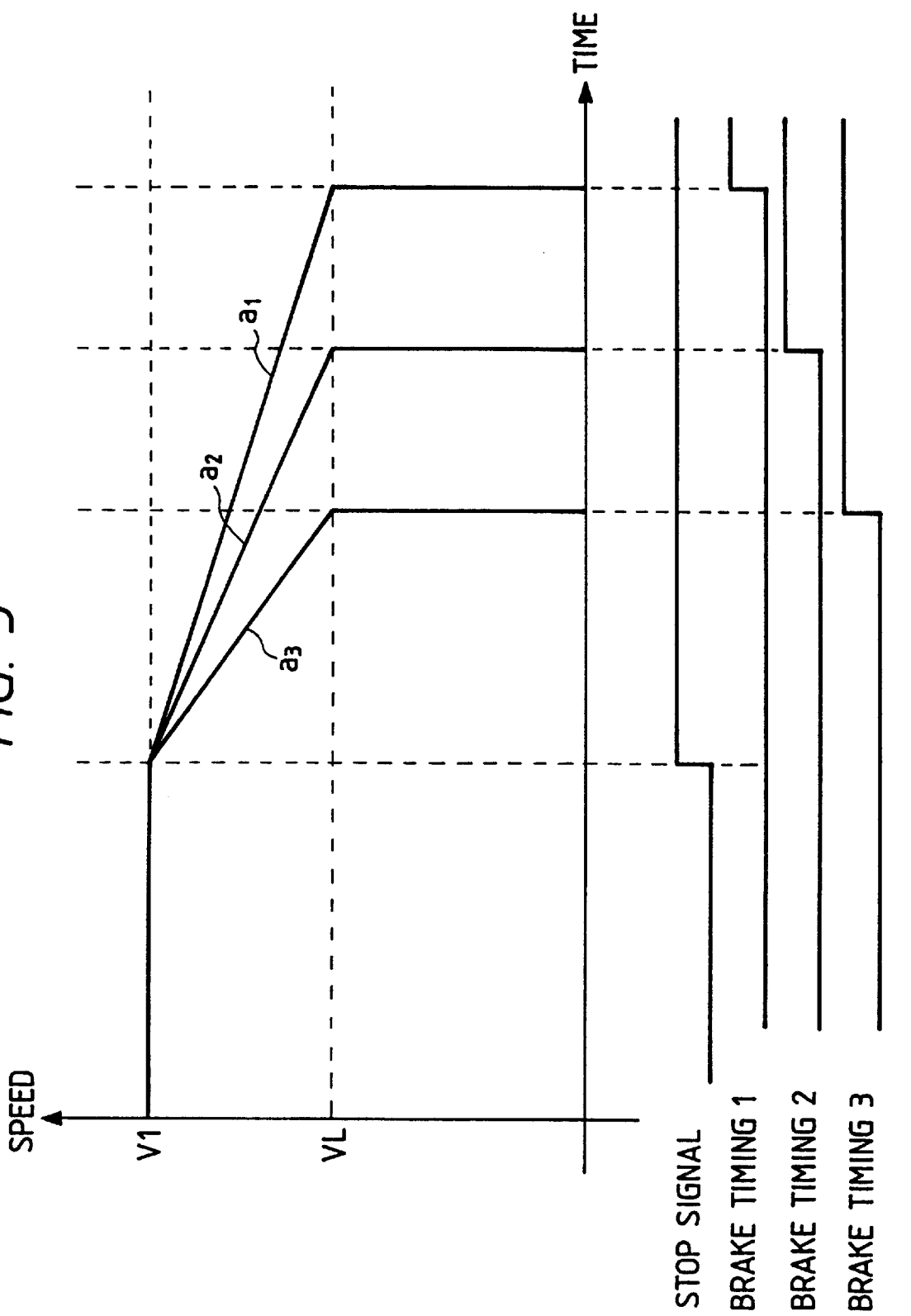
FIG. 3 is a waveform diagram illustrating running stop operation of a tape running apparatus of the present invention.

Therefore, when the control speed Vn outputted from the control speed change-over means 16 in above explanation is equal to the speed V1 which is higher than the allowable speed VL, the stop signal is inputted and the speed is decelerated to the speed VL from the speed V1 as shown in FIG. 3. Thereafter, the stop discriminating means 21 outputs the brake permitting signal to stop the running of the tape. Here, as shown in FIG. 2, since the deceleration rate changes to a1, a2, a3 as the winding radius of the supply reel changes to R1, R2, R3, the brake timing for respective winding radius is different as shown in FIG. 3.

Figure 4:
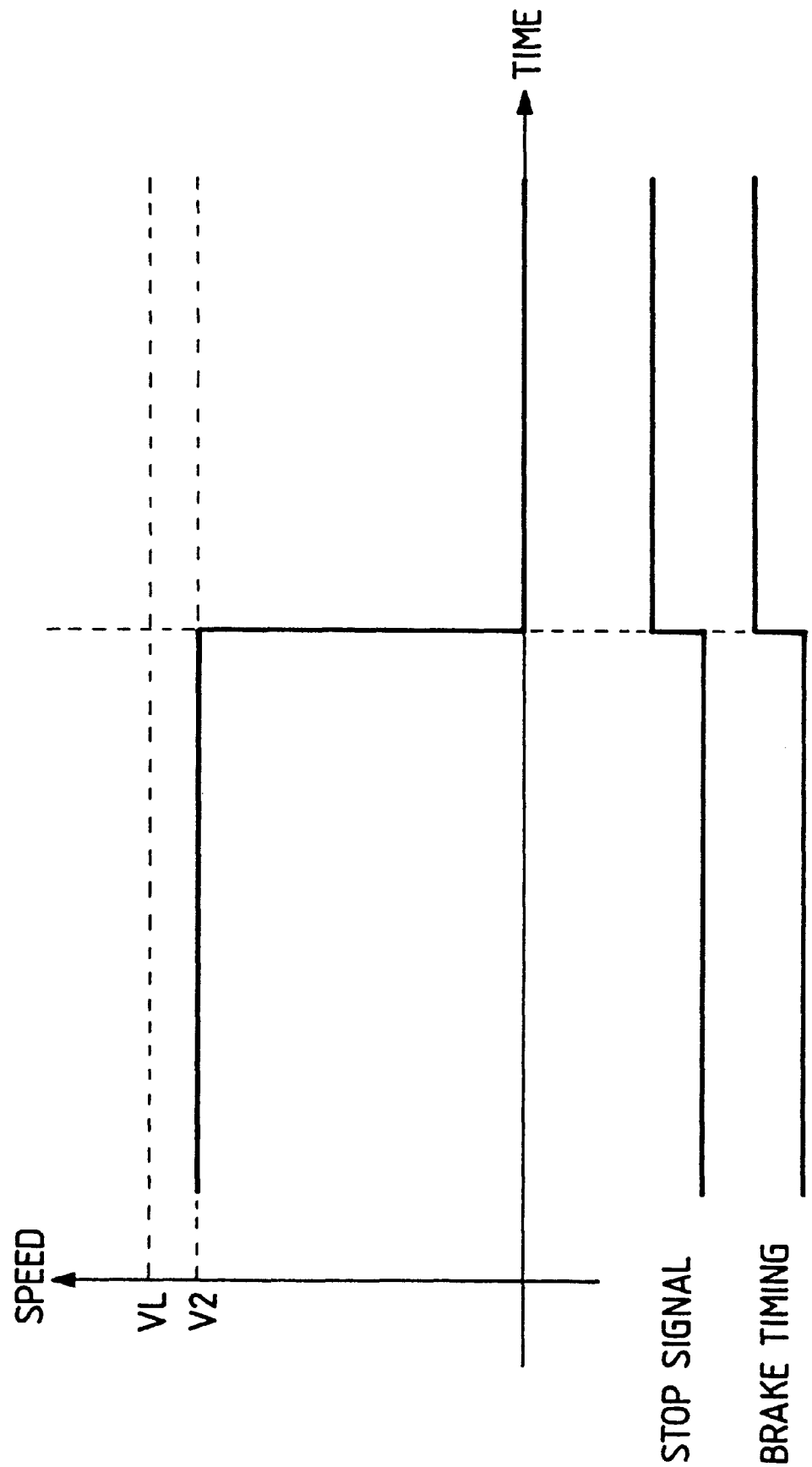
FIG. 4 is a waveform diagram illustrating running stop operation of a tape running apparatus of the present invention.

Moreover, when the control speed Vn is equal to the speed V2 which is lower than the allowable speed VL, the brake permitting signal is outputted from the stop discriminating means 21 simultaneously with the input of the stop signal as in the case of the related art as shown in FIG. 4 to stop the running of the tape.

According to the embodiment explained above, when the tape is running at the speed V1 which is higher than the allowable speed VL, the time required for fast-forward/rewind operation can be reduced remarkably, but since the tape stops after the running speed thereof is decelerated to the speed VL before the stoppage during the stop operation, positioning of the tape is difficult and it is very inconvenient for retrieval of the recorded contents. Moreover, when the tape is running at the speed V2 which is lower than the allowable speed VL, since the tape stops simultaneously with input of the stop signal, it is convenient for retrieval of the recorded contents but the time required for fast-forward/rewind operation is not reduced as in the case of the related art.

Therefore, application flexibility can be improved for various purposes by changing over the tape running speed to the speed V1 and V2 with the control speed change-over means 16.

In addition, the change-over operation can be simplified and application flexibility can further be improved by changing over the speed V1 and V2, for example, when the fast-forward button is depressed during the fast-forward operation or when the rewind button is depressed during the rewind operation.

However, change-over of the speed to V2 from V1 decelerates the control speed to the speed V2 with the deceleration rate (a).

Next, another embodiment of the present invention will be explained with reference to the block diagram of FIG. 5. In FIG. 5, the reference numeral 23 designates a speed variation rate calculating means and 24, a speed limiting means. However, operations of the block designated by the same reference numeral as that in the block diagram of FIG. 1 are same as those as explained above.

As in the case of the above explanation, the deceleration rate (a) set by the deceleration rate setting means 15 is inputted to the speed variation rate calculating means 23. Moreover, the control speed Vn set by the control speed change-over means 16 is inputted to the speed limiting means 24. The speed variation rate calculating means 23 calculates a speed variation rate Δ V(t) at the time t when the speed is decelerated in the deceleration rate (a) inputted from the deceleration rate setting means 15. The speed variation rate Δ V(t) calculated in the speed variation rate calculating means 23 is then inputted to the speed limiting means 24. The speed limiting means 24 outputs, when the control speed Vn inputted from the control speed change-over means 16 is lower than the maximum speed Vmax which is obtained by adding the predetermined speed Vm to the speed variation rate Δ V(t) inputted from the speed variation rate calculating means 23, the control speed Vn as the new control speed Vn' and also outputs the maximum speed Vmax as the new control speed Vn' when the control speed Vn is higher than the maximum speed Vmax. The control speed Vn' outputted from the speed limiting means 24 is then inputted to the velocity error detecting means 17. Hereinafter, the tape running speed V follows up the control speed Vn' as the case explained above.

Therefore, in the case of stopping the running of the tape, the time until actual stop from input of the stop signal can be set within t by calculating the maximum speed Vmax in the speed limiting means 24 considering the predetermined speed Vm as the allowable speed VL and then immediately effectuating the brake when it is detected that the tape speed becomes equal to the allowable speed VL in the stop discriminating means 21.

Moreover, as explained previously, when the tape speed is changed over between the speed V1 and V2 (V1>V2), deceleration to the speed V2 from the speed V1 can be completed within the time t by calculating the maximum speed Vmax considering the predetermined speed Vm as the speed V2.

In above embodiment, the tape is supplied from one reel and is then taken up by the other reel, but the present invention does not limit the behavior of the tape between both reels and existence of the cassette. For instance, the present invention can obviously be applied to the fast-forward /rewind operation by the reel drive of a helical scanning type VTR utilizing the rotary head, DAT, digital data recorder, cassette type tape recorder utilizing the fixed head, open reel type tape recorder and digital data recorder or the like.

Moreover, in above embodiment, the tape running at the speed V1 which is remarkably higher than the ordinary playback speed is stopped or the tape running speed V1 is changed over to the speed V2. However, the present invention is not limited thereto and does not give any particular limitation on the speed so long as it is remarkably higher than the ordinary playback speed. For instance, the present invention can also be applied to the system where the tape running speed is controlled by the rotating speed of the take-up reel.

As explained above, according to the present invention, since the tape is stopped after it is decelerated to the allowable speed VL before it stops, the tape can be run at the speed higher than the allowable speed VL and the time required for the fast-forward/rewind operation can be reduced to a large extent without giving any damage to the tape.

In addition, a couple of running modes provided in the speed V1 which is higher than the allowable speed VL and the speed V2 which is lower than the allowable speed VL enables selective application depending on the purposes and also improves application flexibility.

Furthermore, since the maximum speed is limited depending on the preset deceleration rate (a), the time required until the tape tops and the decelerating operation until the desired speed Vm can be completed within the time t.

What is claimed is:

1. A tape speed control apparatus based on a reel drive for taking up a tape to a take-up reel from a supply reel, comprising:

a motor driver which causes the tape to run at a higher speed than an ordinary playback speed;

a speed detector which detects a current tape speed;

a calculator which calculates a data representing a wound tape-quantity on the supply reel;

a decelerator which decelerates the tape speed at a rate based on said data in response to a stop command signal; and a brake which stops the tape being run when the current tape speed detected by said speed detector becomes lower than a preset speed during the deceleration.

2. A tape speed control method based on a reel drive for taking up a tape to a take-up reel from a supply reel, comprising:

causing the tape to run at a higher speed than an ordinary playback speed;

detecting a current tape speed;

calculating a data representing a wound tape-quantity on the supply reel;

decelerating the tape speed at a rate based on said data in response to a stop command signal; and stopping the tape being run when the detected current tape speed becomes lower than a preset speed during the deceleration.

* * * * *